United States Patent [19]
Chibata et al.

[11] 3,922,195
[45] Nov. 25, 1975

[54] PROCESS FOR PREPARING L-MALIC ACID

[75] Inventors: Ichiro Chibata, Suita; Tetsuya Tosa, Kyoto; Tadashi Sato; Kozo Yamamoto, both of Takatsuki, all of Japan

[73] Assignee: Tanabe Seiyaku Co. Ltd., Osaka, Japan

[22] Filed: Oct. 17, 1974

[21] Appl. No.: 515,689

[52] U.S. Cl. .................................. 195/30; 195/54
[51] Int. Cl.² .............................................. C12D 1/02
[58] Field of Search ................................ 195/30, 54

[56] References Cited
UNITED STATES PATENTS

| | | | |
|---|---|---|---|
| 2,972,566 | 2/1961 | Kitahara et al. | 195/30 |
| 3,767,790 | 10/1973 | Guttag | 195/54 |

*Primary Examiner*—Alvin E. Tanenholtz
*Attorney, Agent, or Firm*—Bierman & Bierman

[57] ABSTRACT

At least one acryloyl monomer is polymerized in an aqueous suspension containing a fumarase-producing microorganism. The acryloyl monomers employed in the present invention include acryloylamide, N,N'-lower alkylene-bis-acryloylamide, bis(acryloylamidomethyl)ether and N,N'-di-acryloylethyleneurea. The resultant immobilized fumarase-producing microorganism is subjected to enzymatic reaction with fumaric acid or a salt thereof. L-Malic acid is produced.

16 Claims, No Drawings

PROCESS FOR PREPARING L-MALIC ACID

This invention relates to a process for preparing L-malic acid. More particularly, it relates to a process for preparing L-malic acid by enzymatic reaction of an immobilized fumarase-producing microorganism with fumaric acid or a salt thereof.

It is well known in the art that fumarase (Enzyme Classification Number: 4.2.1.2) is an enzyme catalyzing the reversible reaction between fumaric acid and L-malic acid.

Various methods for producing L-malic acid by the enzymatic reaction of fumarase with fumaric acid or a salt thereof have been known. For example, L-malic acid can be prepared by cultivating a fumarase-producing microorganism in a nutrient medium containing fumaric acid or a salt thereof, and recovering L-malic acid from the resultant fermentation broth (Japanese Pat. Publication Nos. 16547/1966 and 14786/1969). Alternatively, it can be prepared by reacting a fumarase-producing microorganism with fumaric acid or a salt thereof [Japanese Pat. Publication Nos. 4511/1962 and 1191/1969, The Journal of General and Applied Microbiology, Vol. 6, No. 2, pages 108 – 116(1960)]. However, these methods are not suitable for large scale production. L-malic acid production according to these known methods is accompanied with contamination with microbial cells, nutrient sources and/or proteins. Accordingly, additional steps of removing the microbial cells and other contaminants from the product are required to recover L-malic acid in high purity. Moreover, when the enzymatic reaction is completed, the reaction solution is boiled and/or acidified to destroy the fumarase-producing microorganism, and precipitates of the microorganism are filtered off. Thus, the fumarase-producing microorganism can be used only once and must be discarded thereafter.

One object of the present invention is to provide a novel immobilized microorganism which affords high activity of fumarase for a long period of time. Another object of the present invention is to provide an immobilized fumarase-producing microorganism which obviates the necessity of discarding the microorganism and allows its reuse in successive operations. Another object of the invention is to provide an improved method of preparing L-malic acid from fumaric acid or a salt thereof by the use of a fumarase-producing microorganism. A further object of the invention is to provide a method which eliminates the necessity of additional steps in separating the desired product, i.e., L-malic acid, from the substances present in the reaction mixture. An additional object of the invention is to provide an improved method of preparing L-malic acid without accompaning the production of succinic acid as a by-product. Still further objects of the present invention will be apparent from the descriptions which follow.

According to the present invention, L-malic acid can be prepared by the steps of polymerizing at least one acryloyl monomer in an aqueous suspension containing a fumarase-producing microorganism, and subjecting the resultant immobilized fumarase-producing microorganism to enzymatic reaction with fumaric acid or a salt thereof.

Preferred examples of the fumarase-producing microorganisms which are employed in the present invention include *Brevibacterium ammoniagenes* IAM (Institution of Applied Microbiology, Tokyo University, Japan) 1641(ATCC 6871)[cf. Bergey's Manual of Determinative Bacteriology, 7th edition, p. 499(1957)], *Brevibacterium ammoniagenes* IAM 1645(ATCC 6872)[cf. ibid., p. 499], *Corynebacterium equi* IAM 1038[cf. ibid., p. 588], *Escherichia coli* ATCC 11303[cf. ibid., p. 336], *Microbacterium flavum* IAM 1642[cf. ibid., p. 601], *Proteus vulgaris* IFO for Fermentation, Osaka, Japan) 3045[cf. ibid., p. 365], *Pichia farinosa* IFO 0574[cf. The Chemistry and Biology of Yeast (edited by A. H. p. p.37(1958)]. All of these microorganisms are publicly available from the above-mentioned depositories. In this connection, however, it should be noted that the present invention is not limited to the use of these specific microorganisms, but includes within its scope the use of all of fumarase-producing microorganisms such as those belonging to the genera of *Brevibacterium*, *Corynebacterium*, *Escherichia*, *Proteus* and *Pichia*. A suitable amount of the fumarase-producing microorganism which is employed in the present invention is 0.1 to 5 g, especially 1 to 3 g, per g of the acryloyl monomer or monomers used. The polymerization reaction of the present invention serves to tightly entrap each of the microorganisms into the lattice of the polymer thereby affording high enzymatic activity for a long period of time.

The polymerization reaction of the present invention can be carried out in the presence of a polymerization initiator and a polymerization accelerator. Potassium persulfate, ammonium persulfate, vitamin $B_2$ and Methylene Blue are suitable as polymerization initiators. On the other hand, $\beta$-(dimethylamino)-propionitrile and N,N,N',N'-tetramethyl-ethylenediamine are employed as polymerization accelerators. A suitable amount of the polymerization initiator to be added to the aqueous suspension of the fumarase-producing microorganism is 1 to 100 mg per g of the acryloyl monomer or monomers. A suitable amount of the polymerization accelerator to be added is 5 to 10 mg per g of the acryloyl monomer or monomers. It is preferred to carry out the reaction at 5° to 50°C, especially 10° to 30°C. The reaction may be completed within 5 to 60 minutes. The acryloyl monomers which are suitable for use in the present invention include acryloylamide, N,N'-lower alkylene-bis-acryloylamide, bis(acryloylamidomethyl)ether and N,N'-di-acryloyl-ethyleneurea(N,N'-diacryloyl-imidazolidine-2-one).

For the purpose of the present invention, it is suitable to entrap the fumarase-producing microorganism with a polymer obtained from one or two monomers mentioned above, particularly with a copolymer of acryloylamide and an acryloyl monomer selected from the group consisting of N,N'-lower alkylene-bis-acryloylamide, bis(acryloylamidomethyl)ether and N,N'-di-acryloyl-ethyleneurea. N,N'-methylene-bis-acryloylamide and N,N'-propylene-bis-acryloylamide are preferably employed as the N,N'-lower alkylene-bis-acryloylamide. A suitable amount of N,N'-lower alkylene-bis-acryloylamide, bis(acryloylamidomethyl)ether or N,N'-di-acryloyl-ethyleneurea which is used to copolymerize with acryloylamide is 10 to 200 mg, especially 50 to 100 mg, per g of acryloylamide.

After the polymerization reaction is completed as above, the resultant immobilized fumarase-producing microorganism is granulated by passing it through a sieve to form granules of 0.5 to 30 mm, especially 1 to 5 mm in diameter. The fumarase activity of the immobilized preparation thus obtained can be enhanced by treating it with an aqueous solution containing a surfactant and fumaric acid or a salt thereof. The treatment can be preferably carried out by suspending the immobilized preparation in an aqueous solution (pH 6 to 9) containing a surfactant and fumaric acid or a salt thereof, and allowing the suspension to stand at 20° to 40°C. Any one of a cationic surfactant (e.g., cetyl pyridinium chloride, cetyl trimethyl ammonium chloride), an anionic surfactant (e.g., sodium dodecyl sulfate) and a nonionic surfactant (e.g., glyceryl monostearate) is employed as the surfactant. On the other hand, sodium, potassium, ammonium, calcium, magnesium and barium fumarates are employed as the salt of fumaric acid. A preferred concentration of the surfactant in the solution is about 0.005 to 0.5 w/v %. A preferred concentration of fumaric acid or a salt thereof is about 0.5 to 1.0 mole/liter.

Furthermore, it is preferred to treat the immobilized preparation with an organic solvent or a mixture of an organic solvent and water. The treatment of the immobilized preparation with the organic solvent or aqueous organic solvent is especially advantageous in that after said treatment, the immobilized preparation produces no substantial by-products such as succinic acid by enzymatic reaction thereof with fumaric acid. This treatment is also advantageous because it obviates the step of separating L-malic acid from succinic acid. Once L-malic acid is contaminated with succinic acid, it may be difficult to separate the former from the latter by ordinary purification procedures. Besides, the fumarase activity of the immobilized preparation can be enhanced by the treatment with the organic solvent. The treatment with the organic solvent can be carried out by soaking the immobilized preparation in an organic solvent or a mixture of an organic solvent and water, preferably under stirring. It is preferred to carry out the treatment at 20° to 40°C at a pH of 6 to 9. Preferred examples of the organic solvent include an alkanone having 3 to 6 carbon atoms (e.g., acetone, methyl ethyl ketone), an alkanol having one to 6 carbon atoms (e.g., methanol, ethanol, propanol, butanol), a dialkyl ether having 2 to 6 carbon atoms (e.g., diethyl ether), dioxane, toluene, ethyl acetate and chloroform.

L-Malic acid can be prepared by enzymatic reaction of the immobilized fumarase-producing microorganism with fumaric acid or a salt thereof. Sodium, potassium, ammonium, calcium, magnesium and barium fumarates are suitable as the salt of fumaric acid. The enzymatic reaction can be carried out at 5° to 60°C, especially at 10° to 50°C. It is preferred to carry out the reaction at a pH of 5 to 10, especially at pH 7 to 7.5. The enzymatic reaction of the present invention can be accelerated by conducting it in the presence of a surfactant. For this purpose, the same surfactant as used for activation of the granules of the immobilized fumarase-producing microorganism can be employed. A preferred concentration of the surfactant in the reaction solution is about 0.005 to 0.5 w/v %. The concentration of substrate is not critical in the present invention. For example, when sodium fumarate is employed as the substrate, it is dissolved in water at any concentration. The above-mentioned immobilized microorganism is suspended in the aqueous solution of sodium fumarate, and the suspension is stirred. After the reaction is completed, the mixture is filtered or centrifuged to remove the immobilized microorganism for subsequent use. An aqueous solution containing sodium L-malate is obtained as the filtrate or supernatant solution. L-Malic acid can be recovered from the filtrate or supernatant. On the other hand, when a slightly water-soluble fumarate, for example, calcium fumarate is employed as the substrate, it is suspended in water. The immobilized microorganism is added to the aqueous suspension of calcium fumarate and the mixture is stirred. After the reaction is completed, calcium L-malate is obtained as the crystalline precipitate. The optimum condition for convertion of fumaric acid or a salt thereof to L-malic acid can be readily obtained by adjusting the reaction time.

Alternatively, the enzymatic reaction of the present invention can be performed by a column method. The column method enables the reaction to be carried out in a successive manner. For example, the immobilized microorganism is charged into a column, and an aqueous solution of fumaric acid or a salt thereof is passed through the column. An aqueous solution containing L-malic acid or a salt thereof is obtained as the effluent. Recovery of L-malic acid from the effluent can be carried out in a conventional manner. For example, when sodium fumarate is employed as the substrate, L-malic acid can be recovered by the steps of acidifing the effluent with hydrochloric acid, removing the resultant precipitates of fumaric acid by filtration, adding calcium carbonate or calcium hydroxide to the filtrate, collecting the resultant precipitates of calcium L-malate by filtration, adding sulfuric acid to the obtained calcium L-malate, removing the resultant precipitates of calcium sulfate by filtration, and treating the filtrate with an ion-exchange resin. On the other hand, when a slightly water-soluble fumarate, for example, calcium fumarate is employed as the substrate, it is preferred to employ it together with a water-soluble fumarate, for example, sodium fumarate. In this case, calcium fumarate can be converted to calcium L-malate by the steps of filtering an aqueous suspension of a mixture of calcium fumarate and sodium fumarate under stirring, passing the filtrate through the column, and subjecting the effluent to circulation by returning to the above-mentioned suspension. After the reaction is completed, calcium L-malate is obtained as the crystalline precipitates. The produced calcium L-malate can be converted to L-malic acid in the same manner as described above.

In carrying out the enzymatic reaction, the conversion rate of fumaric acid or a salt thereof to L-malic acid mainly depends upon the enzymatic potency of the immobilized microorganism, the temperature or the reaction time. In the case of the column method, however, the optimum reaction conditions for conversion of fumaric acid or a salt thereof to L-malic acid can be readily obtained by adjusting the flow rate of the substrate solution.

In any case, the immobilized microorganism of the present invention retains a high level of the enzymatic activity during the reaction. Moreover, due to the sufficient durability of the enzymatic activity thereof, the immobilized microorganism of the present invention can be used repeatedly for the enzymatic reaction.

Practical and presently-preferred embodiments of the present invention are shown in the following Experiments and Examples. In this specification, the terminology "lower alkylene" should be interpreted as referring to an alkylene group having one to four carbon atoms.

EXPERIMENT 1

One g of microbial cells of each microorganism shown in Table 1 is immobilized in the same manner as described in Example 1—(1). The stiff gel obtained is granulated by passing it through a sieve to form granules of 2 mm in diameter. The granules are washed with a physiological saline solution. The immobilized preparation thus obtained is suspended in 30 ml. of an aqueous 1 M sodium fumarate solution (pH 7.5) which may or may not contain 0.02% of cetyl pyridinium chloride. The suspension is stirred at 37°C for 1 hour. The reaction mixture is filtered to remove the immobilized preparation. The filtrate is acidified with equal volume of 2 N hydrochloric acid to precipitate fumaric acid, and then filtered. The L-malic acid content in the filtrate is assayed in accordance with the method described in "Analytical Chemistry", 29, 283 (1957). The results are shown in Table 1.

Table 1

Amount ($\mu$ moles) of L-malic acid produced

| Immobilized microorganism | Amount of cetyl pyridinium chloride added | |
|---|---|---|
| | No addition | 0.02 % |
| Brevibacterium ammoniagenes IAM 1461 | 178 | 1,220 |
| Brevibacterium ammoniagenes IAM 1645 | 490 | 3,370 |
| Corynebacterium equi IAM 1038 | 85 | 424 |
| Escherichia coli ATCC 11303 | 268 | 322 |
| Microbacterium flavum IAM 1642 | 195 | 483 |
| Pichia farinosa IFO 0574 | 90 | 650 |
| Proteus vulgaris IFO 3045 | 161 | 263 |

EXPERIMENT 2

One g of microbial cells of *Brevibacterium ammoniagenes* IAM 1645 is immobilized in the same manner as described in Example 1—(1). The stiff gel obtained is granulated by passing it through a sieve to form granules of 2 mm in diameter. The granules are washed with a physiological saline solution. The immobilized preparation thus obtained is added to 30 ml of an aqueous 1 M sodium fumarate solution (pH 7.5) containing 0.02% of cetyl pyridinium chloride. The mixture is allowed to stand at 37°C for a certain period of time to activate the immobilized preparation. The immobilized preparation is collected by filtration, washed with a physiological saline solution, and then suspended in 30 ml of an aqueous 1 M sodium fumarate solution (pH 7.5). The suspension is stirred at 37°C for 1 hour. The reaction mixture is filtered to remove the immobilized preparation. The L-malic acid content in the filtrate is assayed in the same manner as described in Experiment 1. The fumarase activity of the immobilized preparation is calculated therefrom. The results are shown in Table 2.

Table 2

| Activation time (days) | Fumarase activity of the immobilized preparation ($\mu$ moles/hr/g of cells) |
|---|---|
| 0 | 490 |
| 1 | 5,870 |
| 3 | 5,450 |
| 7 | 6,530 |
| 13 | 6,230 |

EXPERIMENT 3

One g of microbial cells of *Brevibacterium ammoniagenes* IAM 1645 is immobilized in the same manner as described in Example 1—(1). The stiff gel obtained is granulated by passing it through a sieve to form granules of 2 mm in diameter. The granules are washed with a physiological saline solution. The immobilized preparation thus obtained is added to 30 ml of an aqueous 1 M sodium fumarate solution (pH 7.0) containing 0.02% of cetyl pyridinium chloride. The mixture is allowed to stand at 37°C for 24 hours to activate the immobilized preparation. The immobilized preparation is collected by filtration, added to 30 ml of an 0.05 M phosphate buffer (pH 7.0) containing acetone, methanol or ethanol at the concentration shown in Table 3. After the mixture is stirred at 25°C for 30 minutes, the immobilized preparation is collected by filtration, washed with a physiological saline solution, and then suspended in 30 ml of an aqueous 1 M sodium fumarate solution (pH 7.5). The suspension is stirred at 37°C for 1 hour. The L-malic acid content in the reaction solution is assayed in the same manner as described in Experiment 1 and the fumarase activity of the immobilized preparation is calculated therefrom. After the enzymatic reaction is carried out for further 20 hours, the reaction mixture is filtered to remove the immobilized preparation. The L-malic acid content in the filtrate is assayed in the same manner as described in Experiment 1 and the succinic acid content in the filtrate is assayed by a paper chromatography using a mixture of butanol, acetic acid and water (4 : 1 : 1) as the developer. The ratio of succinic acid to L-malic acid is calculated therefrom. The results are shown in Table 3.

Table 3

| Organic solvent and the concentration thereof | | Fumarase activity of the immobilized preparation ($\mu$ moles/hr/g of cells) | Ratio of succinic acid to L-malic acid(%) |
|---|---|---|---|
| | 0 % | 5,226 | >2.5 |
| Acetone | 20 % | 5,809 | >2.5 |
| " | 33 % | 6,429 | 1–2.5 |
| " | 50 % | 9,138 | <0.5 |
| " | 67 % | 7,408 | <0.5 |
| Methanol | 33 % | 5,580 | <0.5 |
| " | 50 % | 6,080 | <0.5 |
| Ethanol | 33 % | 6,640 | 1–2.5 |
| " | 50 % | 2,385 | <0.5 |

EXAMPLE 1

1. An aqueous nutrient medium (pH 7.0) containing the following ingredients is prepared:

| Glucose | 2.0 | w/v% |
| Fumaric acid | 0.5 | " |
| Urea | 0.2 | " |
| Monopotassium phosphate | 0.2 | " |
| Magnesium sulfate 7 H$_2$O | 0.05 | " |
| Corn steep liquor | 1.0 | " |

*Brevibacterium ammoniagenes* IAM 1645 is inoculated into 200 ml of the medium. The medium is cultivated at 30°C for 20 hours under shaking. Then, the broth is centrifuged. The microbial cells thus collected show the fumarase activity of 10,790 $\mu$ moles/hr/g of cells. 4 g of the microbial cells are suspended in 16 ml of a physiological saline solution. 3 g of acryloylamide, 160 mg of N,N'-methylene-bis-acryloylamide, 2.0 ml of an aqueous 5% β-(dimethylamino)-propionitrile solution and 2.0 ml of an aqueous 1% potassium persulfate solution are added to the suspension. The mixture is allowed to stand at 25°C for 10 minutes. The stiff gel obtained is granulated by passing it through a sieve to form granules of 2 mm in diameter. The granules are washed with a physiological saline solution. 30 g of an immobilized preparation of *Brevibacterium ammoniagenes* IAM 1645 are obtained. Fumarase activity: 450 μ moles/hr/g of gel.

2. 30 g of the immobilized preparation of *Brevibacterium ammoniagenes* IAM 1645 are suspended in 100 ml of an aqueous 1 M sodium fumarate solution (pH 7.5) containing 0.02% of cetyl pyridinium chloride. The suspension is allowed to stand at 37°C for 20 hours, and then filtered. The immobilized preparation thus obtained is washed with a physiological saline solution and then charged into a 1.72 cm × 28.5 cm column. One liter of an aqueous 1 M sodium fumarate solution (pH 7.5) is passed through the column at 37°C at the flow rate of 15 ml/hr. The effluent containing sodium 0.02sodium fumarate in the concentration of 0.85 M and 0.15 M, respectively, is obtained. The effluent is acidified with concentrated hydrochloric acid, and then filtered to remove the precipitates of fumaric acid. 85 g of calcium carbonate are added to the filtrate. The cm precipitates are collected by filtration, washed with water and then dried. 150 g of calcium L-malate dihydrate are obtained. 350 ml of 2N-sulfuric acid are added to calcium L-malate dihydrate. The mixture is filtered to remove the precipitates of calcium sulfate. The filtrate is passed through a column charged with about 150 ml of Amberlite IR-120(H$^+$ type) and then passed through a column charged with about 150 ml of Amberlite IR-45(OH$^-$ type). The effluent is concentrated at 60°C under reduced pressure. The crystalline precipitates are collected by filtration, washed with a small amount of acetone and then dried. 50 g of L-malic acid are obtained. The mother liquor is concentrated and the concentrated solution is treated in the same manner as above. 22 g of L-malic acid are obtained. Total amount: 77 g M.p. 100°C $[\alpha]_D^{20} = -2.2°(C = 8.5, H_2O)$

EXAMPLE 2

An immobilized preparation of *Brevibacterium ammoniagenes* IAM 1645 is prepared in the same manner as decribed in Example 1—(1). 30 g of the immobilized preparation are suspended in 100 ml of an aqueous 1 M sodium fumarate solution (pH 7.5) containing 0.02% of cetyl pyridinium chloride. The suspension is allowed to stand at 37°C for 20 hours and then filtered. The immobilized preparation thus obtained is washed with a physiological saline solution and then charged into a 1.72 cm × 28.5 cm column. An aqueous 1 M sodium fumarate solution (pH 7.5) is passed through the column at 37°C at the flow rate as shown in Table 4. The L-malic acid content in the effluent is assayed in the same manner as described in Experiment 1. The percentage conversion of fumaric acid to L-malic acid is calculated therefrom. The results are shown in Table 4.

Table 4

| Flow rate (ml/hr) | Conversion rate of fumaric acid to L-malic acid (%) |
|---|---|
| 6 | 85 |
| 8.5 | 85 |
| 15 | 85 |
| 26 | 68 |
| 32 | 60 |
| 45 | 48 |
| 72 | 37 |

EXAMPLE 3

An immobilized preparation of *Brevibacterium ammoniagenes* IAM 1645 is prepared in the same manner described in Example 1—(1). 30 g of the immobilized preparation are suspended in 100 ml of an aqueous 1 M sodium fumarate solution (pH 7.5) containing 0.02 % of cetyl pyridinium chloride. The suspension is allowed to stand at 37°C for 20 hours and then filtered. The immobilized preparation thus obtained is washed with a physiological saline solution and then charged into a 1.72 cm × 28.5 column. An aqueous 1 M sodium fumarate solution (pH 7.5) containing 0.001 M magnesium chloride is passed through the column at 35°C or 45°C at the flow rate of 15 ml/hr. The L-malic acid content in the effluent is assayed in the same manner as described in Experiment 1. The percentage conversion of fumaric acid to L-malic acid is calculated therefrom. The results are shown in Table 5.

Table 5

| Operation time (days) | Conversion rate of fumaric acid to L-malic acid (%) | |
|---|---|---|
| | 37°C | 45°C |
| 3 | 85 | 85 |
| 6 | 85 | 85 |
| 9 | 85 | 85 |
| 12 | 85 | 85 |
| 15 | 85 | 83 |
| 18 | 80 | 83 |
| 21 | 78 | 80 |
| 24 | 75 | 77 |
| 27 | 72 | 76 |
| 30 | 68 | 70 |

EXAMPLE 4

An immobilized preparation of *Brevibacterium ammoniagenes* IAM 1645 is prepared in the same manner as described in Example 1—(1). 30 g of the immobilized preparation are suspended in 500 ml of an aqueous 1 M sodium fumarate solution (pH 7.5) containing 0.02% of cetyl pyridinium chloride. The suspension is stirred at 37°C for a certain period of time. The reaction mixture is filtered to remove the immobilized preparation. The L-malic acid in the filtrate is assayed in the same manner as described in Experiment 1. The percentage conversion of fumaric acid to L-malic acid is calculated therefrom. The results are shown in Table 6.

Table 6

| Operation time (hr) | Conversion rate of fumaric acid to L-malic acid (%) |
|---|---|
| 3 | 12 |
| 8 | 30 |
| 24 | 80 |
| 30 | 85 |
| 40 | 85 |

EXAMPLE 5

1. *Microbacterium flavum* IAM 1642 is inoculated into 200 ml of an aqueous medium (pH 7.0) containing the same ingredients as described in Example 1—(1). The medium is cultivated at 30°C for 20 hours under shaking. Then, the broth is centrifuged. The microbial cells thus obtained show the fumarase activity of 810 μ moles/hr/g. 4 g of the microbial cells are suspended in 16 ml of a physiological saline solution. 3 g of acryloylamide, 160 mg of N,N'-methylene-bis-acryloylamide, 2.0 ml of an aqueous 5% β-(dimethylamino)propionitrile solution and 2.0 ml of an aqueous 1% potassium persulfate solution are added to the suspension. Then, the mixture is allowed to stand at 25°C for 10 minutes. After the reaction is completed, the reaction mixture is filtered. The stiff gel thus obtained is granulated by passing it through a sieve to form granules of 2 mm in diameter. The granules are washed with a physiological saline solution. 30 g of an immobilized preparation of *Microbacterium flavum* IAM 1642 are obtained. Fumarase activity: 65 μ moles/hr/g of gel.

2. 30 g of the immobilized preparation of *Microbacterium flavum* IAM 1642 are charged into a 1.6 cm × 33 cm column. 500 ml of an aqueous 1 M sodium fumarate solution (pH 7.5) containing 0.05% of cetyl pyridinium chloride are passed through the column at 37°C at the flow rate of 3 ml/hr. The effluent containing sodium L-malate and sodium fumarate in the concentrations of 0.80 M and 0.20 M, respectively, is obtained. The effluent is treated in the same manner as described in Example 1—(2). 70 g of calcium L-malate dihydrate are obtained.

EXAMPLE 6

An immobilized preparation *Brevibacterium ammoniagenes* IAM 1645 is prepared in the same manner as described in Example 1—(1). 30 g of the immobilized preparation are suspended in 100 ml of an aqueous 1 M sodium fumarate solution containing 0.02% of cetyl pyridinium chloride. The suspension is allowed to stand at 37°C for 20 hours and then filtered. The immobilized preparation thus obtained is washed with a physiological saline solution and then charged into a 1.72 cm × 8.5 cm column. On the other hand, a substrate suspension is prepared by adding 500 ml of an aqueous 1 M calcium fumarate suspension (pH 7.5) containing 0.02% of cetyl pyridinium chloride to 150 ml of an aqueous 1 M sodium fumarate solution (pH 7.5). This substrate suspension is passed through a filter under stirring and the filtrate is passed through the column at 37°C at the flow rate of 50 ml/hr. The effluent is returned to the above-mentioned substrate suspension and subjected to circulation. After the circulation is continued for 40 hours, the crystalline precipitates are collected. 92 g of calcium L-malate dihydrate are obtained.

EXAMPLE 7

An immobilized preparation of *Brevibacterium ammoniagenes* IAM 1645 is prepared in the same manner as described in Example 1—(1). 20 g of the immobilized preparation are suspended in 60 ml of an aqueous 1 M sodium fumarate solution (pH 7.0) containing 0.02% of cetyl pyridinium chloride. The suspension is allowed to stand at 37°C for 24 hours and then filtered. The immobilized preparation thus obtained is suspended in 100 ml of a 0.05 M phosphate buffer (pH 7.0) containing 50% of acetone. The suspension is stirred at 25°C for 30 minutes. The immobilized preparation is collected by filtration, washed with a physiological saline solution, and then charged into a 1.6 cm × 15 cm column. An aqueous 1 M sodium fumarate solution (pH 7.0) is passed through the column at 37°C at the flow rate of 6 ml/hr. The L-malic acid content in the effluent is assayed in the same manner as described in Experiment 1. The percentage conversion of fumaric acid to L-malic acid is calculated therefrom. The results are shown in Table 7.

Table 7

| Operation time (days) | Conversion rate of fumaric acid to L-malic acid (%) |
| --- | --- |
| 2 | 81 |
| 5 | 83 |
| 7 | 85 |
| 9 | 83 |
| 12 | 84 |
| 16 | 81 |
| 19 | 82 |
| 23 | 83 |
| 28 | 83 |
| 33 | 82 |
| 35 | 82 |

EXAMPLE 8

1. 4 g of the microbial cells of *Brevibacterium ammoniagenes* IAM 1645 are suspended in 16 ml of a physiological saline solution. 3 g of acryloylamide, 160 mg of bis(acryloylamidomethyl)ether, 2 ml of 5% β-(dimethylamino)-propionitrile, and 2 ml of 1% potassium persulfate solution are added to the suspension. The suspension is allowed to stand at 25°C for 10 minutes. The stiff gel obtained is granulated by passing it through a sieve to form granules of 2 mm in diameter. The granules are washed with a physiological saline solution. 30 g of the immobilized preparation of *Brevibacterium ammoniagenes* IAM 1645 are obtained. Fumarase activity: 430 μ moles/hr/g of gel.

2. 30 g of the immobilized preparation are suspended in 100 ml of an aqueous solution of 1 M sodium fumarate (pH 7.5) containing 0.02% cetyl pyridinium chloride. The suspension is allowed to stand at 37°C for 20 hours and then filtered. The gel is washed with a physiological saline solution and then suspended in 500 ml of an aqueous solution of 1 M sodium fumarate (pH 7.5). The suspension is stirred at 37°C for 24 hours. The reaction mixture is filtered to remove the immobilized preparation. The L-malic acid in the filtrate is recovered as calcium salt in the same manner as described in Example 1. 70 g of calcium L-malate dihydrate are obatined.

EXAMPLE 9

1. 4 g of the microbial cells of *Brevibacterium ammoniagenes* IAM 1645 are suspended in 16 ml of a physiological saline solution. 3 g of acryloylamide, 160 mg of N,N'-di-acryloyl-ethyleneurea, 2 ml of 5% β-(dimethylamino)-propionitrile, and 2 ml of 1% potassium persulfate solution are added to the suspension. The suspension is allowed to stand at 25°C for 10 minutes. The stiff gel obtained is granulated by passing it through a sieve to form granules of 2 mm in diameter. The granules are washed with a physiological saline solution. 30 g of the immobilized preparation of *Brevibacterium ammoniagenes* IAM 1645 are obtained. Fumarase activity: 450 μ moles/hr/g of gel.

2. 30 g of the immobilized preparation are suspended in 100 ml of an aqueous solution of 1 M sodium fumarate (pH 7.5) containing 0.02% cetyl pyridinium chloride. The suspension is allowed to stand at 37°C for 20 hours and then filtered. The gel is washed with a physiological saline solution and then suspended in 500 ml of an aqueous solution of 1 M sodium fumarate (pH 7.5). The suspension is stirred at 37°C for 24 hours. The reaction mixture is filtered to remove the immobilized preparation. The L-malic acid in the filtrate is recovered as calcium salt in the same manner as described in Example 1. 70 g of calcium L-malate dihydrate are obtained.

EXAMPLE 10

1. 4 g of the microbial cells of *Brevibacterium ammoniagenes* IAM 1645 are suspended in 16 ml of a physiological saline solution. 40 mg of N,N'-methylene-bis(acryloylamide), 1.2 ml of 0.112% N,N,N',N'-tetramethyl-ethylenediamine, and 0.12 ml of 2.5% ammonium persulfate are added to the suspension. The suspension is allowed to stand at 37°C for 60 minutes. The stiff gel obtained is granulated by passing it through a sieve to form granules of 2 mm in diameter. The granules are washed with a physiological saline solution. 25 g of the immobilized preparation of *Brevibacterium ammoniagenes* IAM 1645 are obtained. Fumarase activity: 470 μ moles/hr/g of gel.

2. 25 g of the immobilized preparation are suspended in 500 ml of an aqueous solution of 1 M sodium fumarate (pH 7.5) containing 0.02% cetyl pyridinium chloride. The suspension is stirred at 37°C for 24 hours. The reaction mixture is filtered to remove the immobilized preparation. The L-malic acid in the filtrate is recovered as calcium salt in the same manner as described in Example 1. 70 g of calcium L-malate dihydrate are obtained.

EXAMPLE 11

1. 4 g of the microbial cells of *Brevibacterium ammoniagenes* IAM 1645 are suspended in 16 ml of a physiological saline solution. 40 mg of bis(acryloylamidomethyl)ether, 1.2 ml of 0.112% N,N,N',N'-tetramethyl-ethylenediamine, and 0.12 ml of 2.5% ammonium persulfate are added to the suspension. The suspension is allowed to stand at 37°C for 60 minutes. The stiff gel obtained is granulated by passing it through a sieve to form granules of 2 mm in diameter. The granules are washed with a physiological saline solution. 25 g of the immobilized preparation of *Brevibacterium ammoniagenes* IAM 1645 are obtained. Fumarase activity: 480 μ moles/hr/g of gel.

2. 25 g of the immobilized preparation are suspended in 500 ml of an aqueous solution of 1 M sodium fumarate (pH 7.5) containing 0.02% cetyl pyridinium chloride. The suspension is stirred at 37°C for 24 hours. The reaction mixture is filtered to remove the immobilized preparation. The L-malic acid in the filtrate is recovered as calcium salt in the same manner as described in Example 1. 70 g of calcium L-malate dihydrate are obtained.

EXAMPLE 12

1. 4 g of the microbial cells of *Brevibacterium ammoniagenes* IAM 1645 are suspended in 16 ml of a physiological saline solution. 40 mg of N,N'-di-acryloyl-ethyleneurea, 1.2 ml of 0.112% N,N,N',N'-tetramethyl-ethylenediamine, and 0.12 ml of 2.5% ammonium persulfate are added to the suspension. The suspension is allowed to stand at 37°C for 60 minutes. The stiff gel obtained is granulated by passing it through a sieve to form granules of 2 mm in diameter. The granules are washed with a physiological saline solution 25 g of the immobilized preparation of *Brevibacterium ammoniagenes* IAM 1645 are obtained. Fumarase activity: 480 μ moles/hr/g of gel.

2. 25 g of the immobilized preparation are suspended in 500 ml of an aqueous solution of 1 M sodium fumarate (pH 7.5) containing 0.02% cetyl pyridinium chloride. The suspension is stirred at 37°C for 24 hours. The reaction mixture is filtered to remove the immobilized preparation. The L-malic acid in the filtrate is recovered as calcium salt in the same manner as described in Example 1. 70 g of calcium L-malate dihydrate are obtained.

What we claim is:

1. A process for preparing L-malic acid which comprises the steps of polymerizing N,N'-lower alkylene-bis-acryloylamide, bis (acryloylamidomethyl) ether or N,N' -di-acryloyl-ethyleneurea, or copolymerizing acryloylamide with N,N'-lower alkylene-bis-acryloylamide, bis(acryloylamidomethyl) ether or N,N'-di-acryloyl-ethyleneurea, in an aqueous suspension of a fumarase-producing microorganism to produce an immobilized fumarase-producing microorganism, and subjecting the immobilized fumarase-producing microorganism to enzymatic reaction with fumaric acid or a salt thereof.

2. A process for preparing L-malic acid which comprises the steps of polymerizing N,N'-lower alkylene-bis-acryloylamide, bis(acryloylamidomethyl)ether or N,N'-di-acryloyl-ethyleneurea, or copolymerizing acryloylamide with N,N'-lower alkylene-bis-acryloylamide, bis(acryloylamidomethyl) ether or N,N'-di-acryloyl-ethyleneurea, in an aqueous suspension of a fumarase-producing microorganism in the presence of a polymerization initiator and a polymerization accelerator to produce an immobilized fumarase-producing microorganism, and subjecting the immobilized fumarase-producing microorganism to enzymatic reaction with fumaric acid or a salt thereof.

3. The process according to claim 2, wherein the polymerization is carried out at 5° to 50°C.

4. The process according to claim 2, wherein the enzymatic reaction is carried out at 5° to 50°C at a pH of 5 to 10.

5. The process according to claim 2, wherein the enzymatic reaction is carried out at 5° to 60°C at a pH of 5 to 10 in the presence of 0.005 to 0.5 w/v % of a surfactant.

6. The process according to claim 2, wherein the polymerization initiator is selected from the group consisting of potassium persulfate, ammonium persulfate, vitamin B₂ and Methylene Blue, and the polymerization accelerator is selected from the group consisting of β-

(dimethylamino)-propionitrile and N,N,N',N'-tetramethyl-ethylenediamine.

7. The process according to claim 2, wherein the fumarase-producing microorganism is selected from the group of *Brevibacterium ammoniagenes* IAM 1641, *Brevibacterium ammoniagenes* IAM 1645, *Corynebacterium equi* IAM 1038, *Escherichia coli* ATCC 11303, *Microbacterium flavum* IAM 1642, *Proteus vulgaris* IFO 3045 and *Pichia farinosa* IFO 0574.

8. The process according to claim 2, wherein the salt of fumaric acid is selected from the group consisting of sodium, potassium, ammonium, calcium, magnesium and barium fumarates.

9. A process for preparing L-malic acid which comprises the steps of polymerizing N,N'-lower alkylene-bis-acryloylamide, bis(acryloylamidomethyl)ether or N,N'-di-acryloyl-ethyleneurea, or copolymerizing acryloylamide with N,N'-lower alkylene-bis-acryloylamide, bis(acryloylamidomethyl) ether or N,N'-di-acryloyl-ethyleneurea, in an aqueous suspension of a fumarase-producing microorganism in the presence of a polymerization initiator and a polymerization accelerator at 5° to 50°C, passing the resultant immobilized fumarase-producing microorganism through a sieve to form granules (0.5 to 30 mm in diameter) of the immobilized fumarase-producing microorganism, treating the resultant granules of the immobilized fumarase-producing microorganism with an aqueous solution containing 0.005 to 0.5 w/v % of a surfactant and 0.1 to 1.0 mole/liter of fumaric acid or a salt thereof to activate said granules, and then subjecting the activated granules of the immobilized fumarase-producing microorganism to enzymatic reaction with fumaric acid or a salt thereof at 5° to 60°C at a pH of 5 to 10.

10. A process for preparing L-malic acid which comprises the steps of polymerizing N,N'-lower alkylene-bis-acryloylamide, bis(acryloylamidomethyl)ether or N,N'-di-acryloyl-ethyleneurea, or copolymerizing acryloylamide, with N,N'-lower alkylene-bis-acryloylamide, bis(acryloylamidomethyl)ether or N,N'-di-acryloyl-ethyleneurea, in an aqueous suspension of a fumarase-producing microorganism in the presence of a polymerization initiator and a polymerization accelerator at 5° to 50°C, passing the resultant immobilized fumarase-producing microorganism through a sieve to form granules (0.5 to 30 mm in diameter) of the immobilized fumarase-producing microorganism, treating the resultant granules of the immobilized fumarase-producing microorganism with an organic solvent or a mixture of an organic solvent and water, and then subjecting the treated granules of the immobilized fumarase-producing microorganism to enzymatic reaction with fumaric acid or a salt thereof at 5° to 60°C at a pH of 5 to 10.

11. A process for preparing L-malic acid which comprises the steps of polymerizing N,N'-lower alkylene-bis-acryloylamide, bis(acryloylamidomethyl)ether or N,N'-di-acryloyl-ethyleneurea, or copolymerizing acryloylamide with N,N'-lower alkylene-bis-acryloylamide, bis(acryloylamidomethyl) ether or N,N'-di-acryloyl-ethyleneurea, in an aqueous suspension of a fumarase-producing microorganism in the presence of a polymerization initiator and a polymerization accelerator at 5° to 50°C, passing the resultant immobilized fumarase-producing microorganism through a sieve to form granules (0.5 to 30 mm in diameter) of the immobilized fumarase-producing microorganism, treating the resultant granules of the immobilized fumarase-producing microorganism with an aqueous solution containing to 0.005 to 0.5 w/v % of a surfactant and 0.5 to 1.0 mole/liter of fumaric acid or a salt thereof to activate said granules, treating the activated granules of the immobilized fumarase-producing microorganism with an organic solvent or a mixture of an organic solvent and water, and then subjecting the treated granules of the immobilized fumarase-producing microorganism to enzymatic reaction with fumaric acid or a salt thereof at 5° to 60°C at a pH of 5 to 10.

12. The process according to claim 10, wherein the enzymatic reaction is carried out in the presence of 0.005 to 0.5 w/v % of a surfactant.

13. An immobilized fumarase-producing microorganism comprising a fumarase-producing microorganism tightly entrapped into the lattice of a semipermeable acryloyl polymer selected from the group consisting of homopolymer of N,N'-lower alkylene-bis-acryloylamide, bis(acryloylamidomethyl)ether or N,N'-di-acryloyl-ethyleneurea, copolymer of acryloylamide and N,N'-di-lower alkylene-bis-acryloylamide, copolymer of acryloylamide and bis(acryloylamidomethyl)ether and copolymer of acryloylamide and N,N'-di-acryloyl-ethyleneurea.

14. The immobilized fumarase-producing microorganism as claimed in claim 13, wherein 0.1 to 5 g, per g of the acryloyl polymer, of the fumarase-producing microorganism is entrapped.

15. The immobilized fumarase-producing microorganism as claimed in claim 13, wherein said semipermeable acryloyl polymer is granules of 0.5 to 30 mm in diameter.

16. The immobilized fumarase-producing microorganism as claimed in claim 13, wherein 0.1 to 5 g, per g of the acryloyl polymer, of the fumarase-producing microorganism is entrapped in a copolymer of acryloylamide and 10 to 200 mg, per g of acryloylamide, of N,N'-lower alkylene-bis-acryloylamide, bis(acryloylamidomethyl)ether or N,N'-di-acryloyl-ethyleneurea.

\* \* \* \* \*